US011381397B2

(12) United States Patent
Kawasaki et al.

(10) Patent No.: US 11,381,397 B2
(45) Date of Patent: Jul. 5, 2022

(54) WIRELESS COMMUNICATION DEVICE, WIRELESS COMMUNICATION SYSTEM, WIRELESS COMMUNICATION METHOD, AND RECORDING MEDIUM

(71) Applicant: OLYMPUS CORPORATION, Hachioji (JP)

(72) Inventors: Shinya Kawasaki, Tokyo (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 33 days.

(21) Appl. No.: 17/151,834

(22) Filed: Jan. 19, 2021

(65) Prior Publication Data

US 2021/0143996 A1 May 13, 2021

Related U.S. Application Data

(63) Continuation of application No. PCT/JP2018/027308, filed on Jul. 20, 2018.

(51) Int. Cl.
*H04L 29/06* (2006.01)
*H04L 9/08* (2006.01)
(Continued)

(52) U.S. Cl.
CPC ........... *H04L 9/0891* (2013.01); *H04W 12/03* (2021.01); *H04W 12/04* (2013.01); *H04L 65/60* (2013.01); *H04L 2209/80* (2013.01)

(58) Field of Classification Search
CPC ... H04L 9/0891; H04L 65/60; H04L 2209/80; H04W 12/03; H04W 12/04
See application file for complete search history.

(56) References Cited

U.S. PATENT DOCUMENTS

2005/0074125 A1* 4/2005 Chavanne ........... H04L 63/0428
380/278

FOREIGN PATENT DOCUMENTS

CN      101247220 A   *   8/2008
JP       2004-336392 A     11/2004
(Continued)

OTHER PUBLICATIONS

A. Khan, J. Almeida, B. Fernandes, M. Alam, P. Pedreiras and J. Ferreira, "Towards Reliable Wireless Vehicular Communications," 2015 IEEE 18th International Conference on Intelligent Transportation Systems, 2015, pp. 167-172, doi: 10.1109/ITSC.2015.36. (Year: 2015).*

(Continued)

*Primary Examiner* — Shawnchoy Rahman
(74) *Attorney, Agent, or Firm* — WHDA, LLP

(57) ABSTRACT

A first communicator of a first communication device is configured to use a first wireless channel and execute first key-exchange processing at a timing at which a first key-exchange timer expires. A second communicator of the first communication device is configured to use a second wireless channel and execute second key-exchange processing at a timing at which a second key-exchange timer expires. When streaming data are transmitted by using one wireless channel of the first wireless channel and the second wireless channel and a difference between a first key-exchange timer value and a second key-exchange timer value is greater than a predetermined range, a control circuit is configured to change a wireless channel used for transmission to the other wireless channel before key-exchange processing in the one wireless channel is started.

9 Claims, 9 Drawing Sheets

(51) Int. Cl.
*H04W 12/03* (2021.01)
*H04W 12/04* (2021.01)
*H04L 65/60* (2022.01)

(56) References Cited

FOREIGN PATENT DOCUMENTS

| | | |
|---|---|---|
| JP | 2008-011176 A | 1/2008 |
| JP | 2011-87249 A | 4/2011 |
| JP | 4943071 B2 | 5/2012 |

OTHER PUBLICATIONS

International Search Report dated Oct. 2, 2018, issued in counterpart International Application No. PCT/JP2018/027308 with English translation (2 pages).

* cited by examiner

WIRELESS COMMUNICATION DEVICE, WIRELESS COMMUNICATION SYSTEM, WIRELESS COMMUNICATION METHOD, AND RECORDING MEDIUM The present application is a continuation application based on International Patent Application No. PCT/JP2018/027308 filed on Jul. 20, 2018, the content of which is incorporated herein by reference.

BACKGROUND OF THE INVENTION

Field of the Invention

The present invention relates to a wireless communication device, a wireless communication system, a wireless communication method, and a recording medium.

Description of Related Art

A wireless communication system transmitting streaming data from a terminal device to a main device by using two wireless channels has been proposed. By using two wireless channels, it is possible to secure the real-time property of processing on streaming data in the main device and also realize stable transmission. The wireless communication system like this may be applied to, for example, an image transmission system that includes a transmission device included in an insertion unit of an endoscope device and includes a reception device connected to a display unit displaying an image. The transmission device transmits image data indicating an image captured by a camera mounted in a tip end part of the insertion unit of the endoscope device to the reception device as streaming data. The reception device outputs the image data received from the transmission device to the display unit. The transmission device generally encrypts the streaming data to be transmitted in each wireless channel in order to ensure information security and then transmits the streaming data.

For example, Wi-Fi protected access 2 (WPA2) has been adopted as an encryption method in the wireless communication method specified in IEEE802.11. In the WPA2, the encryption key used for encrypting data to be transmitted is updated every predetermined period of time in order to ensure information security. In addition, the wireless communication method disclosed in Japanese Patent No. 4943071 includes a process of establishing a second wireless channel between a base station and a wireless terminal when the data to be transmitted that have been encrypted by using a first encryption key are being transmitted by using a first wireless channel between the base station anti the wireless terminal. The wireless communication method further includes a process of confirming that the transmission of the data to be transmitted using the second wireless channel and a second encryption key is normally performed after the data to be transmitted are encrypted by using the second encryption key and transmission and reception of the data using the second wireless channel are started between the base station and the wireless terminal. The wireless communication method also includes a process of disconnecting the first wireless channel.

SUMMARY OF THE INVENTION

According to a first aspect of the present invention, a wireless communication system includes a first communication device and a second communication device. The first communication device includes a first communicator, a second communicator, and a control circuit. The first communicator is configured to connect to the second communication device by using a first wireless channel and, at a timing at which a first key-exchange timer expires, update a first encryption key used for encrypting data transmitted by using the first wireless channel. A first value that is a value of the first key-exchange timer is decremented in accordance with passage of time. The second communicator is configured to connect to the second communication device by using a second wireless channel and, at a timing at which a second key-exchange timer expires, update a second encryption key used for encrypting data transmitted by using the second wireless channel. A second value that is a value of the second key-exchange timer is decremented in accordance with passage of time. When streaming data are transmitted by using one wireless channel of the first wireless channel and the second wireless channel and a difference between the first value and the second value is greater than a predetermined range, the control circuit is configured to change a wireless channel used for transmitting the streaming data to the other wireless channel of the first wireless channel and the second wireless channel before key-exchange processing in the one wireless channel is started. The predetermined range is greater than a period of first key-exchange processing for updating the first encryption key and a period of second key-exchange processing for updating the second encryption key.

According to a second aspect of the present invention, in the first aspect, when the key-exchange processing in the one wireless channel is completed, the control circuit is configured to change the wireless channel used for transmitting the streaming data to the one wireless channel.

According to a third aspect of the present invention, in the first or second aspect, the control circuit is configured to set a period of the key-exchange processing in the one wireless channel to a period not overlapping a channel-search period in the first communicator or the second communicator that connects to the second communication device by using the other wireless channel.

According to a fourth aspect of the present invention, in the any one of the first to third aspects, the control circuit is configured to set a period of the key-exchange processing in the one wireless channel to a period not overlapping a channel switching period in which the other wireless channel is switched to a third wireless channel.

According to a fifth aspect of the present invention, in the fourth aspect, the control circuit is configured to set the channel-switching period to a period not overlapping a period of key-exchange processing in the other wireless channel.

According to a sixth aspect of the present invention, a wireless communication device includes a first communicator, a second communicator, and a control circuit. The first communicator is configured to connect to an external communication device by using a first wireless channel and, at a timing at which a first key-exchange timer expires, update a first encryption key used for encrypting data transmitted by using the first wireless channel. A first value that is a value of the first key-exchange timer is decremented in accordance with passage of time. The second communicator is configured to connect to the external communication device by using a second wireless channel and, at a timing at which a second key-exchange timer expires, update a second encryption key used for encrypting data transmitted by using the second wireless channel. A second value that is a value of the second key-exchange timer is decremented in accordance with passage of time. When streaming data are transmitted by using one wireless channel of the first wireless channel and the second wireless channel and a difference between the first value and the second value is greater than a predetermined range, the control circuit is configured to change a wireless channel used for transmitting the streaming data to the other wireless channel of the first wireless channel and the second wireless channel before key-exchange processing in the one wireless channel is started. The predetermined range is greater than a period of first key-exchange processing for updating the first encryption key and a period of second key-exchange processing for updating the second encryption key.

According to a seventh aspect of the present invention, a wireless communication method in a wireless communication system including a first communication device and a second communication device includes a step. The first communication device includes a first communicator and a second communicator. The first communicator is configured to connect to the second communication device by using a first wireless channel and, at a timing at which a first key-exchange timer expires, update a first encryption key used for encrypting data transmitted by using the first wireless channel. A first value that is a value of the first key-exchange timer is decremented in accordance with passage of time. The second communicator is configured to connect to the second communication device by using a second wireless channel and, at a timing at which a second key-exchange timer expires, update a second encryption key used for encrypting data transmitted by using the second wireless channel. A second value that is a value of the second key-exchange timer is decremented in accordance with passage of time. When streaming data are transmitted by using one wireless channel of the first wireless channel and the second wireless channel and a difference between the first value and the second value is greater than a predetermined range, a wireless channel used for transmitting the streaming data is changed to the other wireless channel of the first wireless channel and the second wireless channel in the step before key-exchange processing in the one wireless channel is started. The predetermined range is greater than a period of first key-exchange processing for updating the first encryption key and a period of second key-exchange processing for updating the second encryption key.

According to an eighth aspect of the present invention, a non-transitory computer readable recording medium saves a program for causing a computer of a communication device to execute a process. The communication device includes a first communicator and a second communicator. The first communicator is configured to connect to an external communication device by using a first wireless channel and, at a timing at which a first key-exchange timer expires, update a first encryption key used for encrypting data transmitted by using the first wireless channel. A first value that is a value of the first key-exchange timer is decremented in accordance with passage of time. The second communicator is configured to connect to the external communication device by using a second wireless channel and, at a timing at which a second key-exchange timer expires, update a second encryption key used for encrypting data transmitted by using the second wireless channel. A second value that is a value of the second key-exchange timer is decremented in accordance with passage of time. When streaming data are transmitted by using one wireless channel of the first wireless channel and the second wireless channel and a difference between the first value and the second value is greater than a predetermined range, the computer changes, in the process, a wireless channel used for transmitting the streaming data to the other wireless channel of the first wireless channel and the second wireless channel before key-exchange processing in the one wireless channel is started. The predetermined range is greater than a period of first key-exchange processing for updating the first encryption key and a period of second key-exchange processing for updating the second encryption key.

According to a ninth aspect of the present invention, in the first aspect, when the difference is less than the predetermined range, the control circuit is configured to update any one of the first value and the second value so that the difference becomes greater than the predetermined range.

DETAILED DESCRIPTION OF THE INVENTION

Hereinafter, embodiments of the present invention will be described with reference to the drawings.

Figure 1:
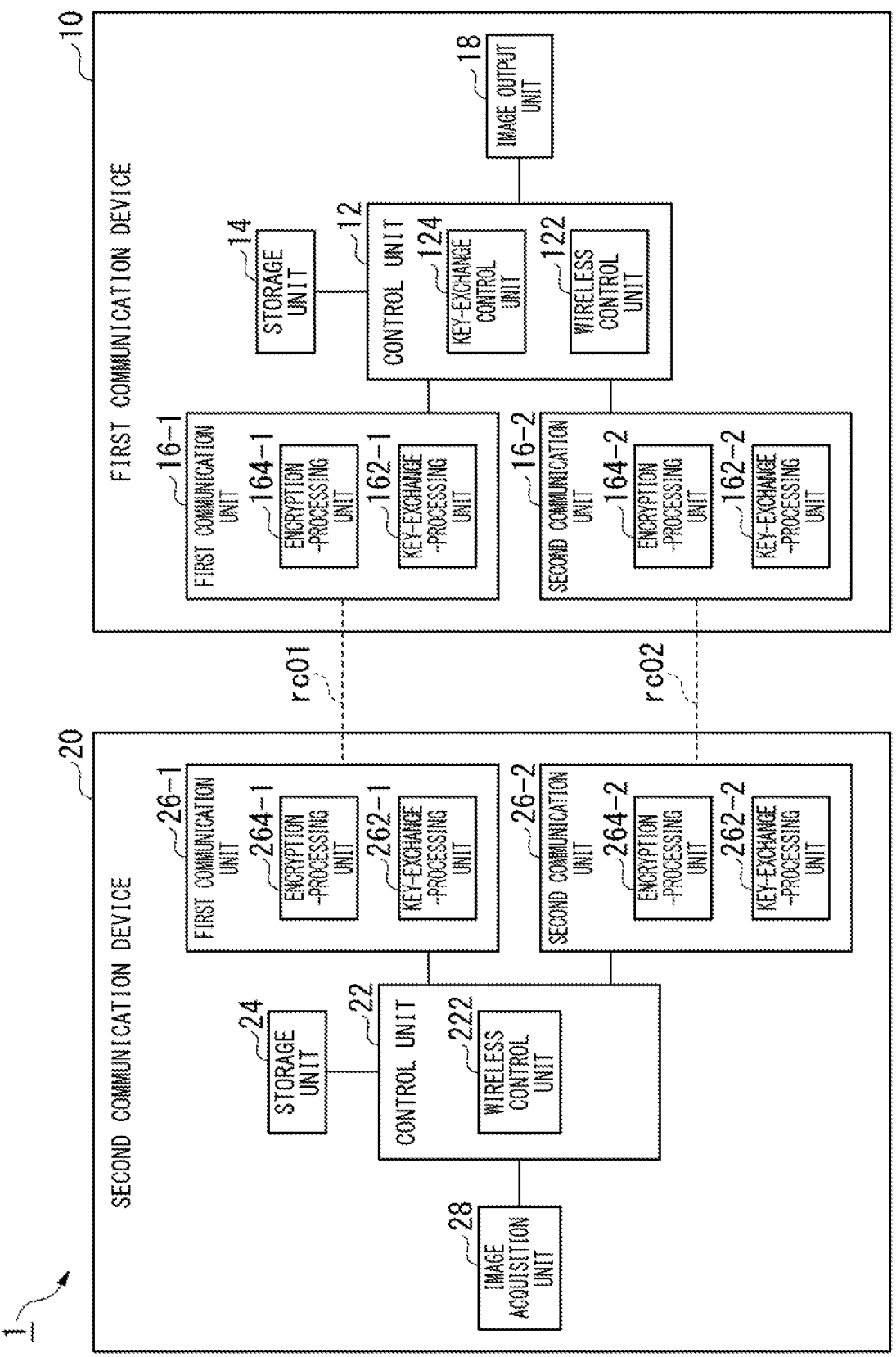
FIG. 1 is a schematic block diagram showing an example of a configuration of a wireless communication system according to an embodiment of the present invention.

FIG. 1 is a schematic block diagram showing an example of a configuration of a wireless communication system 1 according to an embodiment of the present invention.

The wireless communication system 1 includes a plurality of communication devices. In the example shown in FIG. 1, the number of communication devices is two. The first communication device 10 that is one of the two communication devices functions as an image reception device. The first communication device 10 may function as an access point (AP) in the wireless communication system 1. The access point may be called a master device, a base station, or the like. The second communication device 20 that is the other of the two communication devices functions as an image transmission device. The second communication device 20 may function as a station. The station (STA) may be called a client, a slave device, a terminal, or the like. The first communication device 10 and the second communication device 20 can communicate with each other. The first communication device 10 wirelessly receives image data from the second communication device 20 and displays an image on the basis of the received image data. The second communication device 20 sequentially acquires the image data and wirelessly transmits the acquired image data to the first communication device 10.

The first communication device 10 includes a control unit 12, a storage unit 14, a first communication unit 16-1, a second communication unit 16-2, and an image output unit 18.

The control unit 12 controls the functions of the first communication device 10. The control unit 12 includes a wireless control unit 122 and a key-exchange control unit 124. The control unit 12 may include one or more control circuits such as a central processing unit (CPU). Each control circuit may realize some or all of the functions of the control unit 12 by reading a program stored on the storage unit 14 in advance and executing processing indicated by a command specified in the read program. In the following descriptions, execution of processing indicated by a command specified in a program may be simply called "execute a program," "execution of a program," or the like.

The wireless control unit 122 controls wireless communication of each of the first communication unit 16-1 and the second communication unit 16-2. For example, the wireless control unit 122 executes processing such as setting or switching of wireless channels, connection or disconnection, output of transmission data, acquisition of reception data, and the like. The wireless control unit 122 sets a first wireless channel rc1 and a second wireless channel rc2 for the first communication unit 16-1 and the second communication unit 16-2, respectively. For example, when a connection request is received from the second communication device 20 via at least one of the first communication unit 16-1 and the second communication unit 16-2, the wireless control unit 122 establishes connection to the second communication device 20 by using the first wireless channel rc1 and the second wireless channel rc2 that have been set in the first communication unit 16-1 and the second communication unit 16-2, respectively.

The wireless control unit 122 may execute channel search on a communication unit that is not used for transmitting data among the first communication unit 16-1 and the second communication unit 16-2. For example, in a case in which image data are not received by using the first wireless channel rc1 that has been set in the first communication unit 16-1, the wireless control unit 122 controls execution of the channel search on the first communication unit 16-1. The channel search is processing for searching for a better wireless communication channel. For example, the channel search corresponds to the processing of detecting an unused wireless channel.

The key-exchange control unit 124 controls key-exchange processing in each of the first communication unit 16-1 and the second communication unit 16-2. In controlling timings of the key-exchange processing, the key-exchange control unit 124 adjusts a first key-exchange processing period to be a period that does not overlap at least part of a second key-exchange processing period. Alternatively, the key-exchange control unit 124 adjusts the second key-exchange processing period to be a period that does not overlap at least part of the first key-exchange processing period. Here, the first key-exchange processing period and the second key-exchange processing period are periods required for the key-exchange processing in the first communication unit 16-1 and the second communication unit 16-2, respectively.

The storage unit 14 stores various pieces of data used for the processing in the control unit 12, various pieces of data acquired by the control unit 12, and the like. The various pieces of data used for the processing in the control unit 12 include a parameter such as a threshold value used for the processing and include a program and the like. The storage unit 14 includes, for example, a storage medium such as a read-only memory (ROM) and a random-access memory (RAM).

The first communication unit 16-1 and the second communication unit 16-2 are able to transmit and receive various pieces of data to and from other devices by using predetermined wireless communication methods. The first communication unit 16-1 and the second communication unit 16-2 may be communicators independent of each other. As the predetermined wireless communication method, the wireless communication method, for example, specified in IEEE802.11 can be used. The first communication unit 16-1 and the second communication unit 16-2 may have a function as an access point. The first communication unit 16-1 includes a key-exchange-processing unit 162-1 and an encryption-processing unit 164-1. The second communication unit 16-2 includes a key-exchange-processing unit 162-2 and an encryption-processing unit 164-2.

The key-exchange-processing units 162-1 and 162-2 perform generation and exchange of an encryption key. Generation and exchange of an encryption key are implemented, for example, as part of the software that controls the first communication unit 16-1 and the second communication unit 16-2.

The encryption-processing units 164-1 and 164-2 encrypt transmission data and decrypt reception data. Encryption and decryption are implemented, for example, as part of the hardware of the first communication unit 16-1 and the second communication unit 16-2.

The image output unit 18 displays (or outputs) an image on the basis of the image data input from the control unit 12. The control unit 12 receives image data from the second communication device 20 via one of the first communication unit 16-1 and the second communication unit 16-2 and outputs the received image data to the image output unit 18. The image output unit 18 includes, for example, an image display device (nor shown in the drawing) such as a liquid crystal display and an organic electro-luminescence display. The image output unit 18 may include an image output interface instead of an image display device or along with the image display device. The image output interface can be connected to another image display device and can output image data to the image display device connected thereto. In other words, the image display device does not need to be included in the image output unit 18 and may be separated front the first communication device 10.

The second communication device 20 includes a control unit 22, a storage unit 24, a first communication unit 26-1, a second communication unit 26-2, and an image acquisition unit 28.

The control unit 22 controls the functions of the second communication device 20. The control unit 22 includes a wireless control unit 222. The control unit 22 may include one or more processors such as a CPU. Each processor realizes some or all of the functions of the control unit 22 by reading a program stored on the storage unit 24 in advance and executing processing indicated by a command specified in the read program.

The wireless control unit 222 controls wireless communication of each of the first communication unit 26-1 and the second communication unit 26-2. The wireless control unit 222 executes processing such as switching of wireless channels, search for an access point, request of connection or disconnection, output of transmission data, acquisition of reception data, and the like. The search for an access point is also called channel scanning. In searching for the first communication device 10, the wireless control unit 222 detects the first wireless channel rc1 used by the first communication unit 16-1 of the first communication device 10 and the second wireless channel rc2 used by the second communication unit 16-2 of the first communication device 10. Then, the wireless control unit 222 causes the first communication unit 26-1 and the second communication unit 26-2 to establish connection with the first communication unit 16-1 and the second communication unit 16-2 of the first communication device 10, respectively, by using the detected first wireless channel and second wireless channel, respectively.

The wireless control unit 222 may cause a communication unit to which data are not transmitted among the first communication unit 26-1 and the second communication unit 26-2 to execute the channel search. For example, in a case in which image data are not transmitted by using the first wireless channel rc1 that has been set in the first communication unit 26-1, the wireless control unit 222 controls execution of the channel search on the first communication unit 26-1.

The storage unit 24 stores various pieces of data used for the processing in the control unit 22, various pieces of data acquired by the control unit 22, and the like. The various pieces of data used for the processing in the control unit 22 include a parameter such as a threshold value used for the processing and include a program and the like. The storage unit 24 includes, for example, a storage medium such as a ROM and a RAM.

The first communication unit 26-1 is a wireless communication unit that is able to wirelessly transmit and receive various pieces of data by using the same wireless communication method as that used by the first communication unit 16-1. The second communication unit 26-2 is a wireless communication unit that is able to wirelessly transmit and receive various pieces of data by using the same wireless communication method as that used by the second communication unit 16-2. Any of the first communication unit 26-1 and the second communication unit 26-2 may have a function as a client. The first communication unit 26-1 includes a key-exchange processing unit 262-1 and an encryption-processing unit 264-1. The second communication unit 26-2 includes a key-exchange-processing unit 262-2 and an encryption-processing unit 264-2.

The key-exchange-processing units 262-1 and 262-2 perform exchange of an encryption key. Exchange of an encryption key is implemented, for example, as part of the software that controls the first communication unit 26-1 and the second communication unit 26-2.

The encryption-processing units 264-1 and 264-2 encrypt transmission data and decrypt reception data. Encryption and decryption are implemented, for example, as part of the hardware of the first communication unit 26-1 and the second communication unit 26-2.

The image acquisition unit 28 acquires image data. The image acquisition unit 28 is a digital camera that captures a moving image at a predetermined frame rate (for example, 30, 60, or 120 frames per second). The image acquisition unit 28 outputs image data indicating the captured image to the control unit 22. The control unit 22 outputs the image data input from the image acquisition unit 28 to one of the first communication unit 26-1 and the second communication unit 26-2 as transmission data. When the transmission data are input from the control unit 22, the encryption-processing units 264-1 and 264-2 encrypt the input transmission data and wirelessly transmit encrypted data obtained by the encryption to the first communication device 10.

Figure 2:
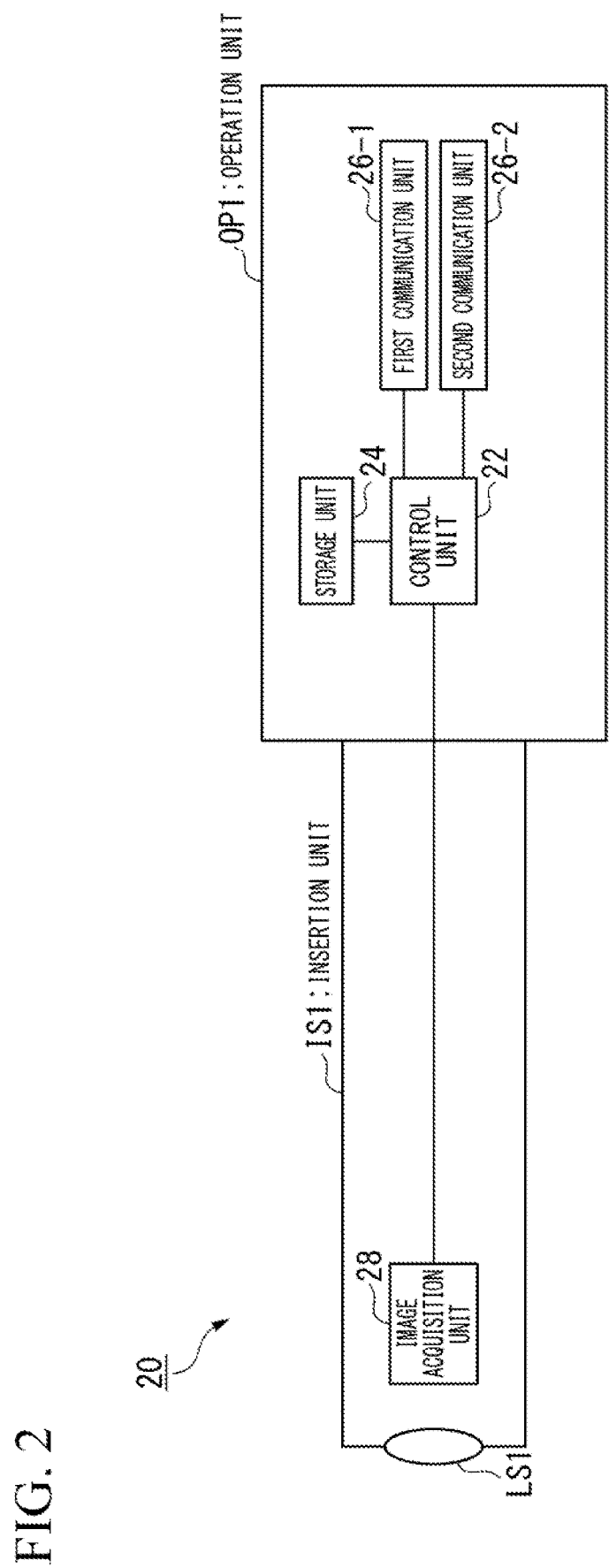
FIG. 2 is a diagram showing an example of an outer configuration of a second communication device according to the embodiment of the present invention.

The second communication device 20 may be realized as part of the endoscope device shown in FIG. 2. The endoscope device includes an insertion unit IS1 and an operation unit OP1. The insertion unit LS1 has an elongated shape with one side much longer than another side. The lens LS1 is mounted in the tip end of the insertion unit IS1 and the other end of the insertion unit IS1 is connected to the operation unit OP1. The image acquisition unit 28 is disposed in the tip end of the insertion unit IS1 and is able to capture an image formed by converged light incident to the lens LS1. The control unit 22, the storage unit 24, the first communication unit 26-1, and the second communication unit 26-2 are disposed inside the operation unit OP1. Therefore, the image acquisition unit 28 disposed atone end of the insertion unit IS1 captures an image, a control unit inside the operation unit OP1 performs various pieces of processing such as image processing on the image data indicating the captured image, and thereafter the image data are wirelessly transmitted to the first communication device 10 by using the first communication unit 26-1 or the second communication unit 26-2.

Next, communication between the first communication device 10 and the second communication device 20 will be described. Different wireless channels are set in the first communication unit 16-1 and the second communication unit 16-2 of the first communication device 10 and the first communication unit 16-1 and the second communication unit 16-2 are opened. To open a unit means that the unit is made to go into a state of being able to wirelessly communicate with another device. The wireless control unit 122 executes the channel search before opening and detects a wireless channel in which the degree of intensity of radio waves from another device is less than or equal to a predetermined degree of intensity or a wireless channel in which the number of communication devices (for example, the number of access points) using the channel is less than or equal to a predetermined number. In the channel search before opening, any one of the first communication unit 16-1 and the second communication unit 16-2 may be used or both of them may be used.

On the other hand, the wireless control unit 222 of the second communication device 20 causes the first communication unit 26-1 and the second communication unit 26-2 to execute the channel scanning. The wireless control unit 222 causes the first communication unit 26-1 and the second communication unit 26-2 to establish connection with the first communication unit 16-1 and the second communication unit 16-2 of the first communication device 10, respectively, by using the first wireless channel rc1 and the second wireless channel rc2, respectively, detected in the channel scanning.

For example, the first communication unit 26-1 of the second communication device 20 executes the channel scanning and detects a beacon signal transmitted from the first communication unit 16-1 of the first communication device 10. The first communication unit 26-1 extracts a service set identifier (SSID) from the detected beacon signal. The SSID is identification information indicating a name of a wireless network. Channel information and transmission speed information are included in the beacon signal in addition to the SSID. The channel information indicates the frequency available for communication, that is, the first wireless channel. The transmission speed information includes information related to a usable transmission speed, for example, information indicating a corresponding band width and a corresponding physical rate. The first communication unit 26-1 determines whether or not the extracted SSID is the preset setting value of the SSID. The setting value of the SSID is, for example, an SSID indicating a network used by the first communication unit 16-1 of the first communication device 10. When the extracted SSID is the preset setting value, the first communication unit 26-1 determines whether or not the wireless channel indicated by the channel information and the transmission speed indicated by the transmission speed information are the wireless channel usable by the first communication unit 26-1 and the transmission speed usable by the first communication unit 26-1, respectively.

The wireless channel usable by the first communication unit 26-1 and the transmission speed usable by the first communication unit 26-1 are set in advance in the first communication unit 26-1. When the first communication unit 26-1 determines that the wireless channel indicated by the channel information and the transmission speed indicated by the transmission speed information are the wireless channel usable by the first communication unit 26-1 and the transmission speed usable by the first communication unit 26-1, respectively, the first communication unit 26-1 executes association processing with the first communication unit 16-1 of the first communication device 10 specified for the SSID. The association processing is processing for establishing connection. Hereinafter, the association processing may be called connection processing.

Figure 3:
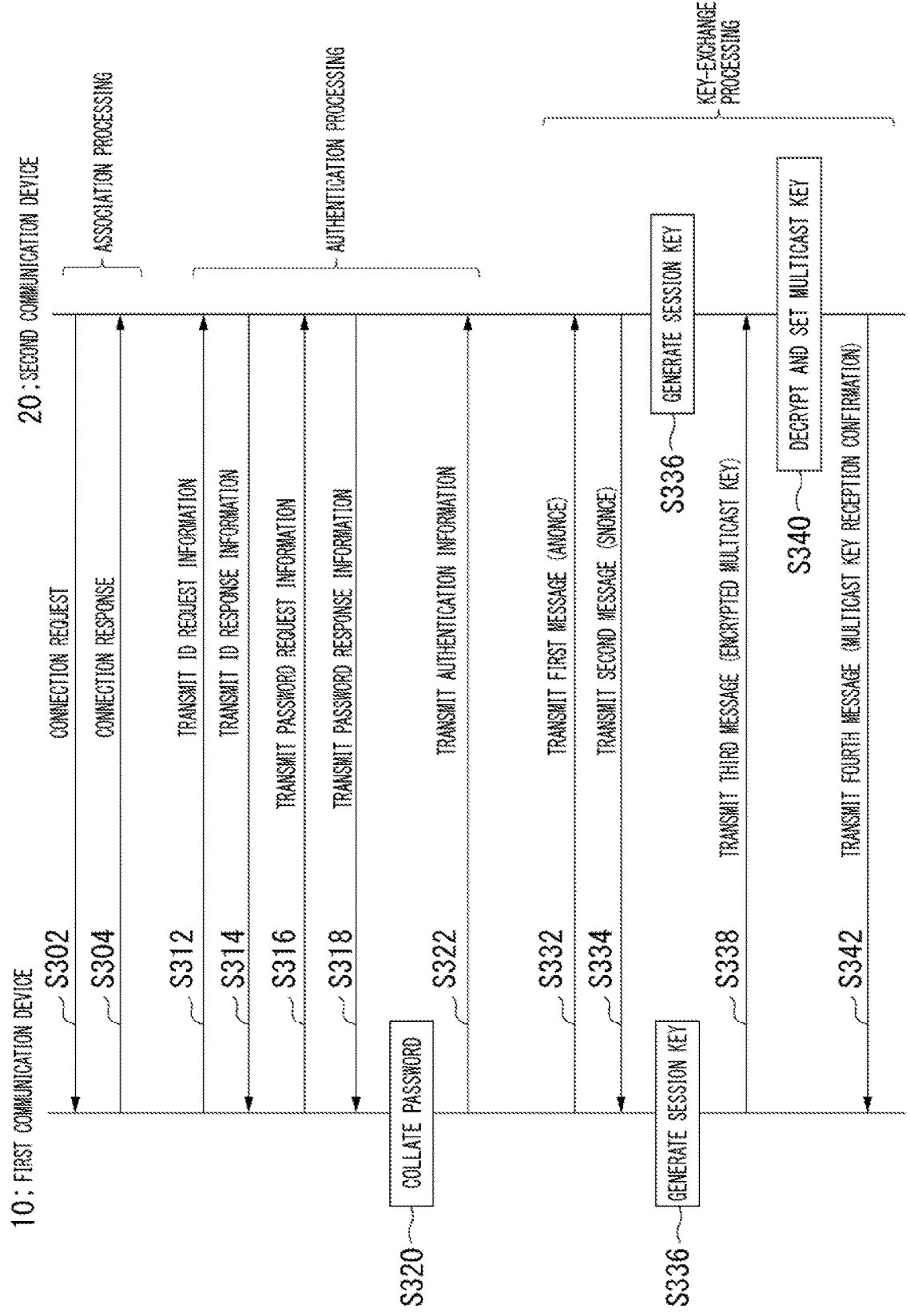
FIG. 3 is a sequence diagram showing an example of association processing, authentication processing, and key-exchange processing according to the embodiment of the present invention.

The association processing shown in FIG. 3 includes the following steps.

(Step S302) The first communication unit 26-1 of the second communication device 20 transmits a connection request (association request) to the first communication unit 16-1 of the first communication device 10.

(Step S304) When the first communication unit 16-1 receives the connection request from the first communication unit 26-1 of the second communication device 20, the first communication unit 16-1 transmits a connection response (association response) as a response of the request to the first communication unit 26-1.

When the first communication unit 26-1 meets at least one of the following conditions (1) to (3), the first communication unit 26-1 does not execute the association processing.

(1) The extracted SSID is not the SSID set in advance.

(2) The wireless channel indicated by the channel information is not the wireless channel usable by the first communication unit 26-1.

(3) The transmission speed indicated by the transmission speed information is not the transmission speed usable by the first communication unit 26-1.

The first communication unit 26-1 executes authentication processing with the first communication unit 16-1 of the first communication device 10 after the association processing is completed. The authentication processing shown in FIG. 3 includes the following steps.

(Step S312) The first communication unit 16-1 of the first communication device 10 transmits identifier (ID) request information to the first communication unit 26-1 of the second communication device 20.

(Step S314) The first communication unit 26-1 transmits ID response information indicating the ID of the first communication unit 26-1 to the first communication unit 16-1 of the first communication device 10.

(Step S316) The first communication unit 161 transmits password request information to the first communication unit 26-1 of the second communication device 20 in accordance with receiving the ID response information from the first communication unit 26-1 of the second communication device 20.

(Step S318) The first communication unit 26-1 transmits password response information indicating the password of the first communication unit 26-1 to the first communication unit 16-1 of the first communication device 10 in accordance with receiving the password request information from the first communication unit 16-1 of the first communication device 10.

(Step S320) The first communication unit 16-1 collates a first password that is set by associating the password with the ID indicated by the ID response information in advance with a second password indicated by the password response information received from the first communication unit 26-1 of the second communication device 20. When the first password and the second password match each other, the first communication unit 16-1 determines that the authentication processing is successful. When the first password and the second password are different from each other, the first communication unit 16-1 determines that the authentication processing has failed.

(Step S322) The first communication unit 16-1 transmits authentication information indicating whether or not the authentication processing is successful to the first communication unit 26-1 of the second communication device 20. The first communication unit 26-1 receives the authentication information from the first communication unit 16-1 of the first communication device 10 and can get to know whether or not the authentication processing is successful. When the authentication processing is successful, the first communication unit 16-1 of the first communication device 10 and the first communication unit 26-1 of the second communication device 20 are wirelessly connected to each other. In a case in which encryption is not necessary, various pieces of communication data can be transmitted and received in this state.

After the connection is established, the key-exchange-processing unit 162-1 of the first communication device 10 executes the key-exchange processing (4-way handshake) with the key-exchange-processing unit 262-1 of the second communication device 20. The key-exchange-processing units 162-1 and 262-1 generate and set two types of encryption keys through the key-exchange processing. The two types of encryption keys indicate a session key PTK (pairwise transient key) and a multicast key GTK (group temporal key). These encryption keys are shared by the key-exchange-processing units 162-1 and 262-1.

The session key PTK can be generated by using a master key PMK (pairwise master key), an authenticator nonce (Anonce), a supplicant nonce (Snonce), a media access control (MAC) address of the first communication unit 16-1, and a MAC address of the second communication unit 16-2. Here, a common password is set in advance to the key-exchange-processing unit 162-1 of the first communication device 10 and the key-exchange-processing unit 262-1 of the second communication device 20, and the master key PMK is generated from the set password. Random numbers different from each other are used as the Anonce and the Snonce. In a case in which the key-exchange processing is repealed, a random number different from the previous one is used each time the key-exchange processing is executed.

In addition, when the above-described authentication processing is executed, the key-exchange-processing unit 162-1 of the first communication device 10 and the key-exchange-processing unit 262-1 of the second communication device 20 may share a common master key PMK. Furthermore, when the channel scanning or the authentication processing is executed, the first communication unit 16-1 of the first communication device 10 may notify the first communication unit 26-1 of the second communication device 20 about the MAC address of the first communication unit 16-1 and the first communication unit 26-1 of the second communication device 20 may notify the first communication unit 16-1 of the first communication device 10 about the MAC address of the first communication unit 26-1.

The session key PTK includes an encryption key KEK (key encryption key), a decryption key KCK (key confirmation key), and a temporary key (TK) as three types of encryption keys. The temporary key TK is key information used for encrypting or decrypting transmission data transmitted by unicast. The encryption key KEK is an encryption key used for encrypting the multicast key GTK generated by the key-exchange-processing unit 162-1 of the first communication device 10. The decryption key KCK is a decryption key used for decrypting the encrypted multicast key GTK. In a case in which the key-exchange processing is repeated, the multicast key GTK different from the previous one is generated each time the key-exchange processing is executed. To "regularly execute key-exchange" may be to regularly exchange the multicast key GTK (refer to Steps S338 to S342 in FIG. 3). In other words, the entire processing of 4-way handshake may be executed only when the authentication is first executed and thereafter does not need to be executed. The multicast key GTK is originally an encryption key used in common by one or more other devices (for example, the first communication unit 26-1 of the second communication device 20) connecting to the first communication unit 16-1 of the first communication device 10. In the embodiment, the multicast key GTK may be generated for each combination of the first communication unit 16-1 of the first communication device 10 and another individual device and may be used for communication between the devices in the combination.

The key-exchange processing shown in FIG. 3 includes the following steps.

(Step S332) The key-exchange-processing unit 162-1 of the first communication device 10 generates the Anonce and transmits a first message indicating the generated Anonce to the key-exchange-processing unit 262-1 of the second communication device 20.

(Step S334) When the key-exchange-processing unit 262-1 receives the first message from the key-exchange-processing unit 162-1 of the first communication device 10, the key-exchange-processing unit 262-1 generates the Snonce. The key-exchange-processing unit 262-1 transmits a second message indicating the generated Snonce to the key-exchange-processing unit 162-1 of the first communication device 10.

(Step S336) The key-exchange-processing units 162-1 and 262-1 generate the session keys PTK.

(Step S338) The key-exchange-processing unit 162-1 of the first communication device 10 generates the multicast key GTK and sets the generated multicast key GTK to the encryption-processing unit 164-1. The encryption-processing unit 164-1 can decrypt reception data from the first communication unit 26-1 of the second communication device 20 by using the multicast key GTK and can output the reception data obtained through the decryption to the control unit 12. The key-exchange-processing unit 162-1 encrypts the generated multicast key GTK by using the encryption key KEK and transmits a third message indicating the encrypted multicast key GTK to the key-exchange-processing unit 262-1 of the second communication device 20.

(Step S340) The key-exchange-processing unit 262-1 decrypts the encrypted multicast key GTK indicated by the third message received from the key-exchange-processing unit 162-1 of the first communication device 10 by using the decryption key KCK and sets the multicast key GTK obtained through the decryption to the encryption processing unit 264-1. The encryption-processing unit 264-1 can encrypt transmission data input from the control unit 22 by using the multicast key GTK and can transmit the encrypted transmission data to the first communication unit 161 of the first communication device 10.

(Step S342) The key-exchange-processing unit 262-1 of the second communication device 20 transmits a fourth message indicating reception acknowledgement (ACK) of the multicast key GTK to the key-exchange-processing unit 162-1 of the first communication device 10. The key-exchange-processing unit 162-1 is notified of completion of the key-exchange processing by receiving the fourth message from the key-exchange-processing unit 262-1 of the second communication device 20.

The second communication unit 16-2 of the first communication device 10 and the second communication unit 26-2 of the second communication device 20 can also execute the above-described channel scanning, association processing, and key-exchange processing independently of the first communication unit 16-1 of the first communication device 10 and the first communication unit 26-1 of the second communication device 20.

Figure 6:
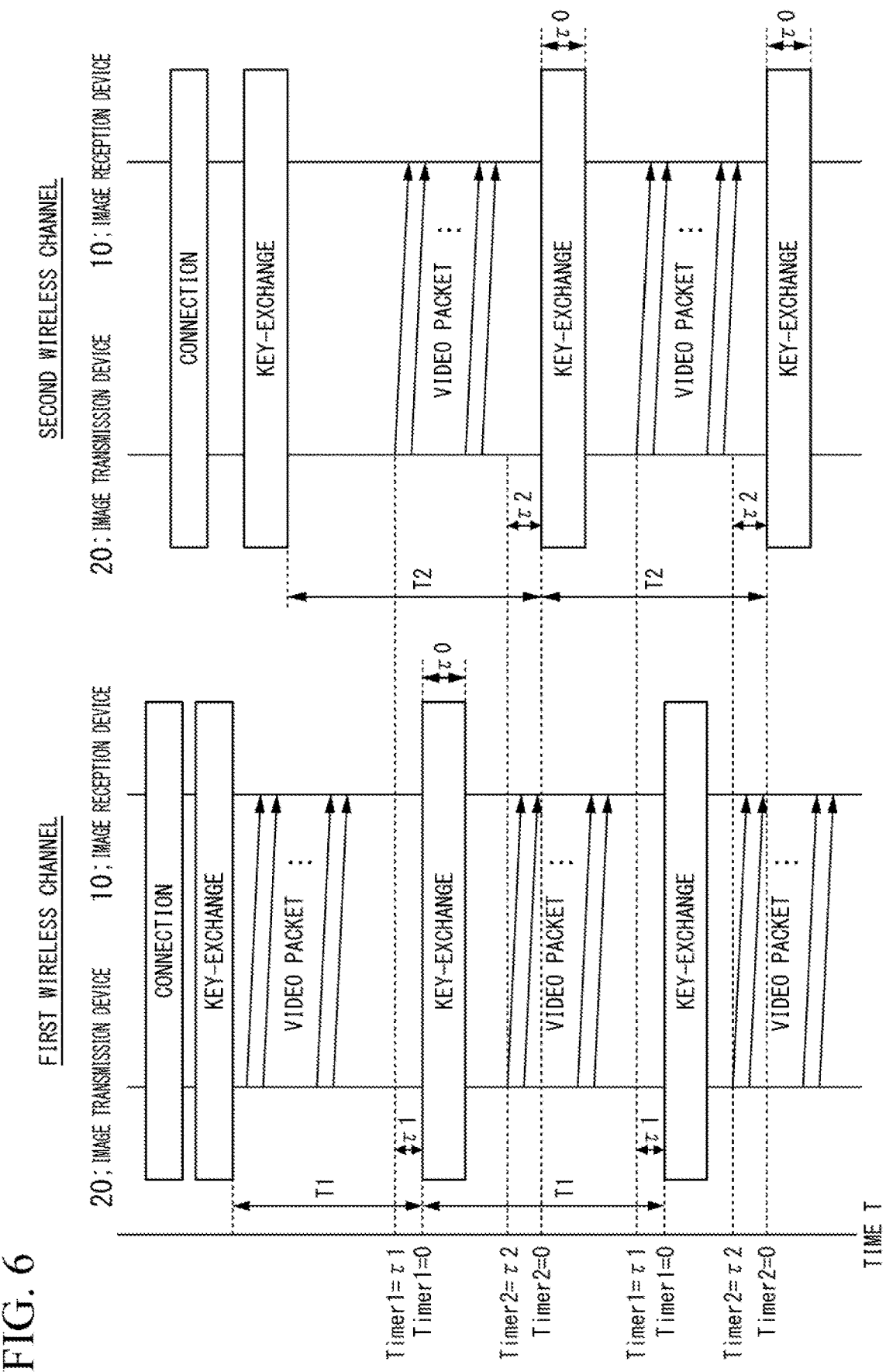
FIG. 6 is a sequence chart showing the order of transmission of image data and the key-exchange processing in each wireless channel according to the embodiment of the present invention.

FIG. 6 shows an example of a case in which the first communication unit 16-1 of the first communication device 10 and the first communication unit 26-1 of the second communication device 20 are connected to each other by using a first wireless channel and the second communication unit 16-2 of the first communication device 10 and the second communication unit 26-2 of the second communication device 20 are connected to each other by using a second wireless channel. In this example, the key-exchange processing is executed in each of the first wireless channel and the second wireless channel. Here, in the period of the key-exchange processing, only packets (key-exchange packets) including information related to the key-exchange are transmitted and the key-exchange control unit 124 of the first communication device 10 is unable to transmit communication data such as image data. Therefore, the key-exchange control unit 124 prevents transmission of the image data from being interrupted by using at least one of the first wireless channel and the second wireless channel for transmitting the image data. The key-exchange control unit 124 controls timings of the key-exchange processing so that the periods of the key-exchange processing for updating an encryption key do not overlap each other between the first wireless channel and the second wireless channel. Hereinafter, the period of the key-exchange processing is called a key-exchange period.

Figure 4:
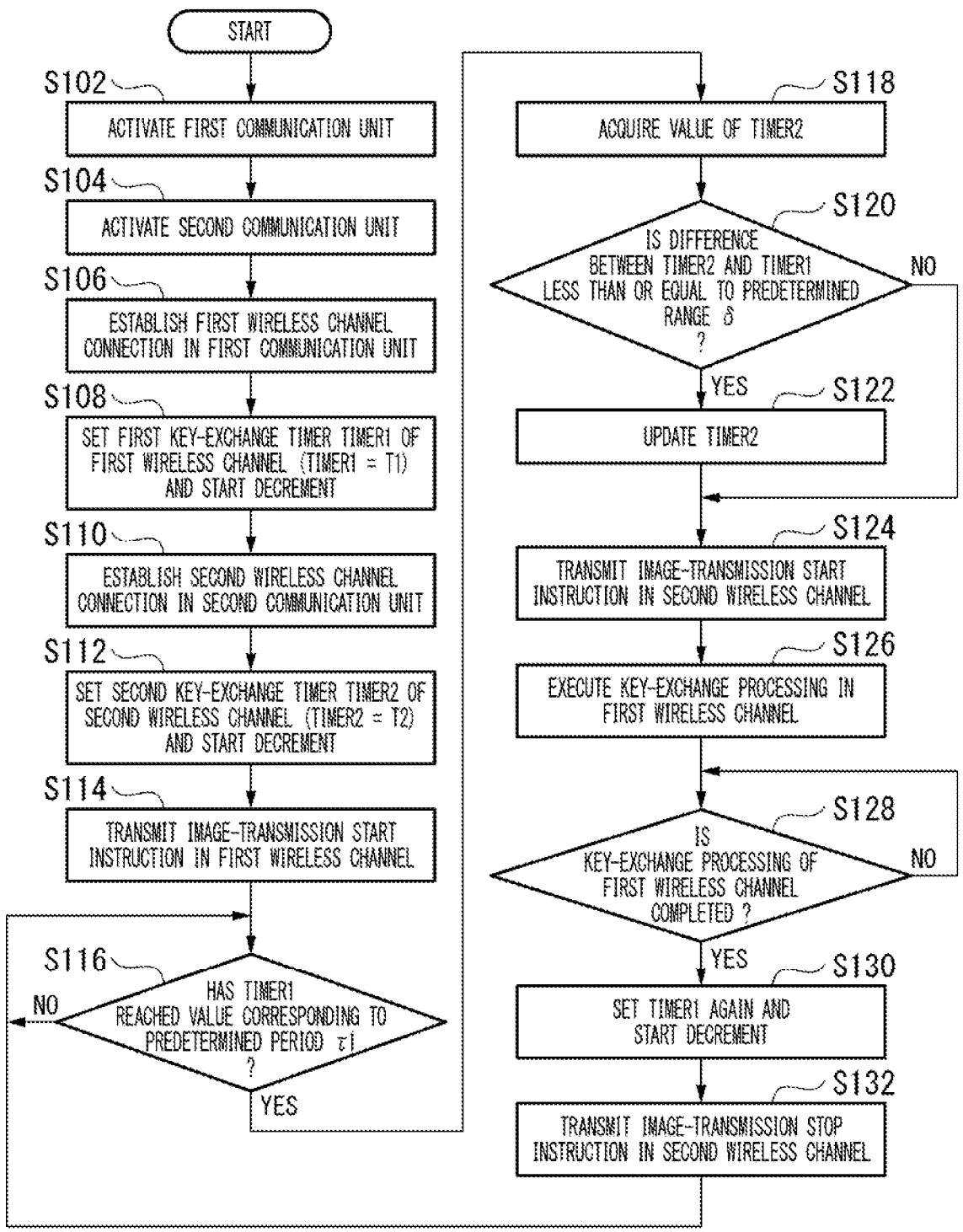
FIG. 4 is a flow chart showing an example of controlling timings of key-exchange in a first communication device according to the embodiment of the present invention.

Next, an example of controlling timings of the key-exchange of an encryption key will be described. FIG. 4 is a flow chart showing an example of controlling timings of the key-exchange in the first communication device 10 according to the embodiment of the present invention. In the example shown in FIG. 4, the case is shown in which the wireless control unit 122 controls timings of the key-exchange processing in the first wireless channel and uses the second wireless channel as a detour for transmitting image data before and after the key-exchange processing.

(Step S102) The control unit 12 activates the first communication unit 16-1. Thereafter, the processing of Step S104 is executed.

(Step S104) The control unit 12 activates the second communication unit 16-2. Thereafter, the processing of Step S106 is executed.

(Step S106) When the wireless control unit 122 receives a connection request from the second communication device 20 via the first communication unit 16-1, the wireless control unit 122 causes the first communication unit 16-1 to execute the association processing, the authentication processing, and the key-exchange processing in this order with the first communication unit 26-1 of the second communication device 20. When the association processing is completed, connection in the first wireless channel is established. Thereafter, the processing of Step S108 is executed.

(Step S108) The key-exchange control unit 124 sets an initial value of a first key-exchange timer value T1 (Timer1=T1) for the first wireless channel and starts decrement of the first key-exchange timer value. This initial value is a value that corresponds to a key-exchange cycle in the first wireless channel and is set in advance. The decrement of the timer value corresponds to measurement of time. In other words, the timer value Timer1 at a certain time point is changed to a value obtained by subtracting, from the initial value, a value corresponding to a period t of elapsed time in which the tinier value T1 changes from the value at the time of starting the decrement (Timer1=T1−t). Thereafter, the processing of Step S110 is executed.

(Step S110) When the wireless control unit 122 receives a connection request from the second communication device 20 via the second communication unit 16-2, the wireless control unit 122 causes the second communication unit 16-2 to execute the association processing, the authentication processing, and the key-exchange processing in this order with the second communication unit 26-2 of the second communication device 20. When the association processing is completed, connection in the second wireless channel is established. Thereafter, the processing of Step S112 is executed.

(Step S112) The key-exchange control unit 124 sets an initial value of a second key-exchange timer value T2 (Timer2=T2) for the second wireless channel and starts decrement of the second key-exchange timer value (Timer2=T2−1). This initial value is a value that corresponds to a key-exchange cycle in the second wireless channel and is set in advance. The initial value of the second key-exchange timer value T2 may be the same as the initial value of the first key-exchange timer value T1. Thereafter, the processing of Step S114 is executed.

(Step S114) The wireless control unit 122 transmits an image-transmission start instruction in the first wireless channel to the second communication device 20 via the first communication unit 16-1. The wireless control unit 222 of the second communication device 20 receives the image-transmission start instruction from the first communication device 10 via the first communication unit 26-1. Thereafter the wireless control unit 222 starts transmitting image data input from the image acquisition unit 28 as transmission data to the first communication device 10 via the first communication unit 26-1 by using the first wireless channel. Thereafter, the processing of Step S116 is executed.

(Step S116) The key-exchange control unit 124 determines whether or not the first key exchange timer value Timer1 reaches a value corresponding to a predetermined period of time (for example, τ1). The state in which the first key-exchange timer value Timer1 reaches the value corresponding to the predetermined period τ1 indicates that the length of time until the first key-exchange timer expires is τ1. When the first key-exchange timer value Timer1 reaches the value corresponding to the predetermined period τ1 (Step S116 YES), the key-exchange control unit 124 executes the processing of Step S118. When the first key-exchange timer value Timer1 does not reach the value corresponding to the predetermined period τ1 (Step S116 NO), the key exchange control unit 124 repeats the processing of Step S116.

(Step S118) The key-exchange control unit 124 acquires the second key-exchange timer value T2 at the current time point. Thereafter, the processing of Step S120 is executed.

(Step S120) The key-exchange control unit 124 determines whether or not the difference (Timer2−Timer1) between the second key-exchange timer value Timer2 and the first key-exchange timer value Timer1 is less than or equal to a predetermined range δ. The fact that the difference (Timer2−Timer1) is less than or equal to the predetermined range δ indicates that at least part of a first key-exchange period in the first wireless channel overlaps a second key-exchange period in the second wireless channel. In other words, in a case in which the first key-exchange period and the second key-exchange period are the same, the predetermined range δ has only to be greater than the length of the key-exchange periods. In a case in which the first key-exchange period and the second key-exchange period are different from each other, the predetermined range δ has only to be greater than the greater one of the key-exchange periods. When the difference (Timer2−Timer1) is less than or equal to the predetermined range δ (Step S120 YES), the key-exchange control unit 124 executes the processing of Step S122. When the difference (Timer2−Timer1) is greater than the predetermined range δ (Step S120 NO), the key-exchange control unit 124 executes the processing of Step S124.

(Step S122) The key-exchange control unit 124 updates the second key-exchange timer value Timer2 with a greater value. In this update, the second key-exchange timer value Timer2 needs to be at least greater than the predetermined range δ. Thereafter, the processing of Step S124 is executed.

(Step S124) The wireless control unit 122 transmits an image-transmission start instruction in the second wireless channel to the second communication device 20 via the second communication unit 16-2. The wireless control unit 222 of the second communication device 20 receives the image-transmission start instruction from the first communication device 10 via the second communication unit 26-2. Thereafter, the wireless control unit 222 starts transmission of the image data input from the image acquisition unit 28 via the second communication unit 26-2 and stops the transmission via the first communication unit 26-1. In this way, the wireless channel used for transmitting the image data is switched from the first wireless channel to the second wireless channel. Thereafter, the processing of Step S126 is executed.

(Step S126) The key-exchange control unit 124 causes the key-exchange-processing unit 162-1 to execute the key-exchange processing in the first wireless channel with the key-exchange-processing unit 262-1 of the second communication device 20. When the key-exchange processing is executed, the key-exchange control unit 124 outputs, for example, a key-exchange instruction to the key-exchange-processing unit 162-1. The key-exchange-processing unit 162-1 starts the key-exchange processing when the key exchange instruction is input from the key-exchange control unit 124. When the key-exchange processing is completed, the key-exchange-processing unit 162-1 outputs, for example, a key-exchange-processing-completion notification to the key-exchange control unit 124.

(Step S128) The key-exchange control unit 124 determines whether or not the key-exchange processing is completed. When the key-exchange processing is completed (Step S128 YES), the processing of Step S130 is executed. When the key-exchange processing is not completed (Step S128 NO), the processing of Step S128 is repeated.

(Step S130) The key-exchange control unit 124 sets the initial value of the first key-exchange timer value Timer1 in the first wireless channel (Timer1=T1) again and starts a decrement of the first key-exchange timer value Timer1. Thereafter, the processing of Step S132 is executed.

(Step S132) The wireless control unit 122 transmits an image-transmission start instruction in the first wireless channel to the second communication device 20 via the first communication unit 16-1. The wireless control unit 222 of the second communication device 20 receives the image-transmission start instruction from the first communication device 10 via the first communication unit 26-1. Thereafter the wireless control unit 222 starts transmission of the image data input from the image acquisition unit 28 via the first communication unit 26-1. Thereafter, the wireless control unit 122 transmits on image-transmission stop instruction in the second wireless channel in the second communication device 20 via the second communication unit 16-2. The wireless control unit 222 of the second communication device 20 receives the image-transmission stop instruction from the first communication device 10 via the second communication unit 26-2. Thereafter, the wireless control unit 222 stops transmission of the image data input from the image acquisition unit 28 via the second communication unit 26-2. In this way, the wireless channel related to the transmission of the image data is switched from the second wireless channel to the first wireless channel. Thereafter, the processing of Step S116 is executed again.

In the example shown in FIG. 4, the transmission of the image data in the second wireless channel is stopped after the key-exchange processing in the first wireless channel is completed, but the second wireless channel keeps a connection state. In other words, it is possible to transmit and receive data by using the second wireless channel. Therefore, the wireless control unit 222 of the second communication device 20 may cause the transmission of the image data using the second wireless channel to be continued until next key-exchange processing is started.

Figure 5:
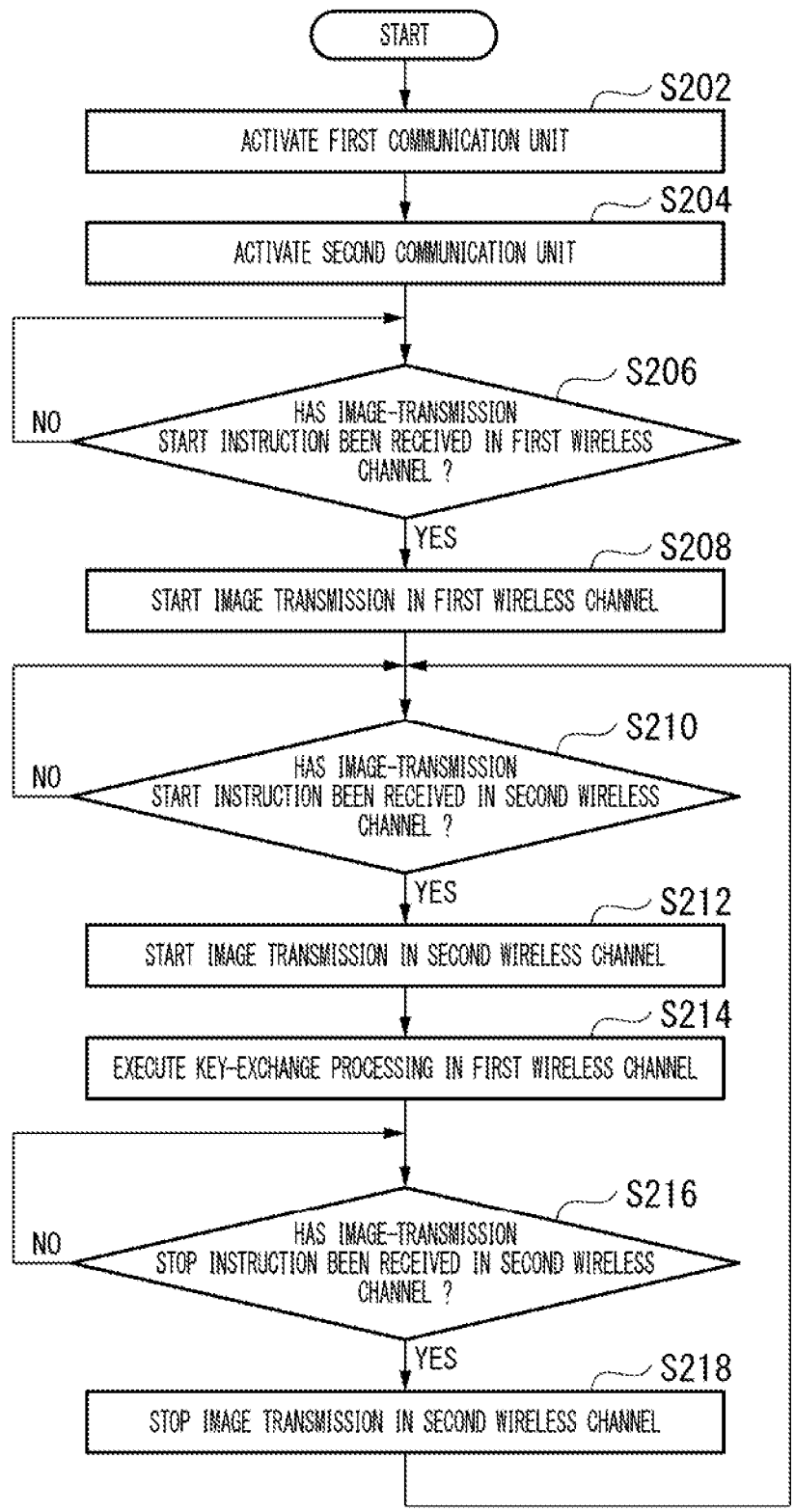
FIG. 5 is a flow chart showing an example of controlling a wireless channel in the second communication device according to the embodiment of the present invention.

Next, an example of wireless channel control of the second communication device 20 will be described. FIG. 5 is a flow chart showing an example of the wireless channel control in the second communication device 20 according to the embodiment of the present invention. In FIG. 5, an example of the case is shown in which the first communication device 10 controls timings of the key exchange shown in FIG. 4 and switches between transmission channels of the image data.

(Step S202) The control unit 22 activates the first communication unit 26-1. Thereafter, the processing of Step S204 is executed. The wireless control unit 222 causes the first communication unit 26-1 to search for the first communication unit 16-1 of the first communication device 10 (channel scanning) and execute connection processing. When the connection processing is started, the first communication unit 26-1 transmits a connection request to the first communication unit 16-1 of the first communication device 10. When the connection processing is completed, the first communication unit 16-1 of the first communication device 10 and the first communication unit 26-1 of the second communication device 20 connect to each other by using the first wireless channel.

(Step S204) The control unit 22 activates the second communication unit 26-2. The wireless control unit 222 causes the second communication unit 26-2 to search for the second communication unit 16-2 of the first communication device 10 and execute tire connection processing in the second wireless channel. In the connection processing, the second communication unit 26-2 transmits a connection request to the second communication unit 16-2 of the first communication device 10. When the connection processing is completed, the second communication unit 16-2 of the first communication device 10 and the second communication unit 20-2 of the second communication device 20 connect to each other by using the second wireless channel. Thereafter, the processing of Step S206 is executed.

(Step S206) The wireless control unit 222 determines whether or not the image-transmission start instruction has been received from the first communication device 10 via the first communication unit 26-1 in the first wireless channel. When the wireless control unit 222 determines that the image-transmission start instruction has been received (Step S206 Yes), the wireless control unit 222 executes the processing of Step S208. When the wireless control unit 222 determines that the image-transmission start instruction has not been received (Step S206 NO), the wireless control unit 222 repeals the processing of Step S206.

(Step S208) The wireless control unit 222 transmits the image data input from the image acquisition unit 28 in the first wireless channel. Here, the wireless control unit 222 causes the input image data to be transmitted to the first communication unit 16-1 of the first communication device 10 via the first communication unit 26-1. Thereafter, the processing of Step S210 is executed.

(Step S210) The wireless control unit 222 determines whether or not the image-transmission start instruction in the second wireless channel has been received via the second communication unit 26-2. When the wireless control unit 222 determines that the image-transmission start instruction has been received (Step S210 YES), the processing of Step S212 is executed. When the wireless control unit 222 determines that the image-transmission start instruction has not been received (Step S210 NO), the processing of Step S210 is repeated.

(Step S212) The wireless control unit 222 starts transmitting the image data input from the image acquisition unit 28 in the second wireless channel and stops transmission in the first wireless channel. Here, the wireless control unit 222 switches the output destination of the input image data from the first communication unit 26-1 to the second communication unit 26-2. Thereafter, the processing of Step S214 is executed.

(Step S214) The key-exchange-processing unit 262-1 executes the key-exchange processing in the first wireless channel. When the first message is received from the key exchange processing unit 162-1 of the first communication device 10, the key-exchange-processing unit 262-1 starts the processing handled by the key-exchange-processing unit 262-1. Thereafter, the processing of Step S216 is executed.

(Step S216) The wireless control unit 222 determines whether or not the image-transmission stop instruction in the second wireless channel has been received via the second communication unit 26-2. When the wireless control unit 222 determines that the image-transmission stop instruction has been received (Step S216 YES), the wireless control unit 222 executes the processing of Step S218. When the wireless control unit 222 determines that the image-transmission stop instruction has not been received (Step S216 NO), the wireless control unit 222 repeats the processing of Step S216.

(Step S218) The wireless control unit 222 starts transmitting the image data input from the image acquisition unit 28 in the first wireless channel and stops transmission in the second wireless channel. Here, the wireless control unit 222 switches the output destination of the input image data from the second communication unit 26-2 to the first communication unit 26-1. Thereafter, the processing of Step S210 is executed.

FIG. 6 is a diagram showing an example of a key-exchange period of each of the first wireless channel and the second wireless channel. Through the processing shown in FIG. 4 and FIG. 5, the key exchange processing in the first wireless channel and the key-exchange processing in the second wireless channel are repeated for a cycle T1 and a cycle T2, respectively. The cycle T1 and the cycle T2 may be the same. In transmission of the image data, the first wireless channel is mainly used. The wireless control unit 222 of the second communication device 20 switches the wireless channel used for transmitting the image data from the first wireless channel to the second wireless channel when the current time point reaches the time point "Timer1=$\tau$1" earlier by a predetermined period $\tau$1 than the time point (Timer1=0) at which the key-exchange processing in the first wireless channel is started. The predetermined period $\tau$1 has only to be longer than a period of time required for switching from the first wireless channel to the second wireless channel. The wireless control unit 222 switches the wireless channel used for transmitting the image data from the second wireless channel to the first wireless channel after the key-exchange processing is completed. The timing at which the wireless channel is switched from the second wireless channel to the first wireless channel has only to be no later than the time point (Timer2=$\tau$2) earlier by a predetermined period $\tau$2 of time than the time point (Timer2=0) at which the key-exchange processing in the second wireless channel is started. The predetermined period $\tau$2 has only to be longer than a period of time required for switching from the second wireless channel to the first wireless channel. The predetermined periods $\tau$1 and $\tau$2 have only to be longer than a period of time required for switching between wireless channels used for transmitting video data. The predetermined periods $\tau$1 and $\tau$2 may be shorter or longer than a key-exchange period $\tau$0. In addition, the cycles T1 and T2 of key-exchange are generally much longer than the key-exchange period $\tau$0.

In addition, the examples shown in FIGS. 4 to 6 indicate the case in which the first wireless channel is mainly used for transmitting the image data, but the second wireless channel may be mainly used for the transmission of the image data. In such a case, the wireless control unit 222 of the second communication device 20 switches the wireless channel used for transmitting the image data from the second wireless channel to the first wireless channel at the time point (Timer2=$\tau$2) earlier by the period $\tau$2 than the time point at which the key-exchange processing in the second wireless channel is started. In addition, after the key-exchange processing in the second wireless channel is completed, the wireless control unit 122 switches the wireless channel used for transmitting the image data from the first wireless channel to the second wireless channel at no later than the time point (Timer1=$\tau$1) earlier by the period $\tau$1 than the time point at which the key-exchange processing in the first wireless channel is started.

In addition, in updating the second key-exchange timer value Timer2 in Step S122 (FIG. 4), the key-exchange control unit 124 changes, for example, the second key-exchange timer value Timer2 to a greater value. Here, there is a case in which the second key-exchange timer value Timer2 cannot be arbitrarily changed due to the specifications of the second communication unit 16-2 and the second key-exchange timer value Timer2 is set to be its initial value at the time of establishing connection. In such a case, the key-exchange control unit 124 causes the second communication unit 16-2 to disconnect the second wireless channel and execute reconnection. In order to disconnect the wireless channel and execute reconnection, the value of $\tau$1 or $\tau$2 has only to be a value that ensures enough time to complete the reconnection. When the reconnection is established, a predetermined initial value is set as the second key-exchange timer value Timer2 and decrement is started. Therefore, the second key-exchange timer value Timer2 changes from a value immediately before the disconnection to a value immediately after the reconnection. In addition, the key-exchange control unit 124 may cause the second communication unit 16-2 to execute the channel search (described below) after connecting to the second communication unit 26-2 and execute reconnection by using a third wireless channel set through the channel search.

FIG. 4 shows the example in which the key-exchange control unit 124 of the first communication device 10 executes timer processing, but the embodiment of the present invention is not limited to this. The control unit 22 of the second communication device 20 may execute the timer processing and the timer processing in the key-exchange control unit 124 may be omitted. The timer processing that the control unit 22 of the second communication device 20 should execute specifically includes setting an initial value of the first key-exchange timer value Timer1 (Steps S108 and S130), setting an initial value of the second key-exchange timer value Timer2 (Step S112), and updating the second key exchange timer value Timer2 (Step S122).

Here, when the control unit 22 determines that the first key-exchange timer value Timer1 reaches the value corresponding to the predetermined period (Step S116 YES), the wireless control unit 222 of the second communication device 20 switches the wireless channel used for transmitting the image data from the first wireless channel to the second wireless channel in Step S124. Transmission of the image-transmission start instruction from the wireless control unit 122 may be omitted.

In Step S126, the wireless control unit 222 has only to transmit the key-exchange instruction to the key-exchangeprocessing unit 162-1 of the first communication device 10 by using the first wireless channel. In this way, the key exchange processing unit 162-1 can start the key exchange processing. The key-exchange-processing unit 162-1 transmits the key-exchange-processing-completion notification to the control unit 22 of the second communication device 20 by using the first wireless channel when the key-exchange processing is completed.

In Step S132, the wireless control unit 222 switches the wireless channel related to transmission of the image data from the second wireless channel to the first wireless channel. Transmission of the image-transmission stop instruction from the wireless control unit 122 may be omitted.

MODIFIED EXAMPLE

Next, a first modified example of the embodiment of the present invention will be described. In this modified example, the key-exchange control unit 124 of the first communication device 10 sets an execution period of the key-exchange processing in the first communication unit 16-1 so that part of the execution period of the key-exchange processing in the first communication unit 16-1 does not overlap at least part of a channel-search period of the second communication unit 16-2 as well as at least part of a period of the key exchange processing in the second wireless channel. The channel-search period is a period in which the second communication unit 16-2 executes the channel search. The channel search is processing of searching for another wireless channel (hereinafter, the channel is called a third wireless channel) in which the communication quality is better than a predetermined degree of communication quality.

In the channel search, the second communication unit 16-2, for example, measures electric field intensity of a received signal arriving at the second communication unit 16-7 for each wireless channel (frequency) usable by the second communication unit 16-2 without transmitting a transmission signal (radio waves) from the second communication unit 16-2. The first wireless channel in use may be excluded from the wireless channel to be used for measurement. The second communication unit 16-2 selects a wireless channel having the electric field intensity less than a predetermined threshold value of electric field intensity. Alternatively, the second communication unit 16-2 may select a channel having the smallest number of beacons (that is, the number of access points) received when the measurement is executed in the wireless channel used for the measurement. Otherwise, the second communication unit 16-2 may select a channel in which the period of time for communication with the electric field intensity exceeding a predetermined electric field intensity is the shortest in the wireless channel used for the measurement. Alternatively, the second communication unit 16-2 may determine a wireless channel that meets any of the multiple predetermined conditions among these conditions. The wireless control unit 122 may set the channel-search period in the second communication unit 16-2 to a predetermined cycle. The cycle of the channel search is, for example, shorter than the cycle of the key-exchange.

Figure 7:
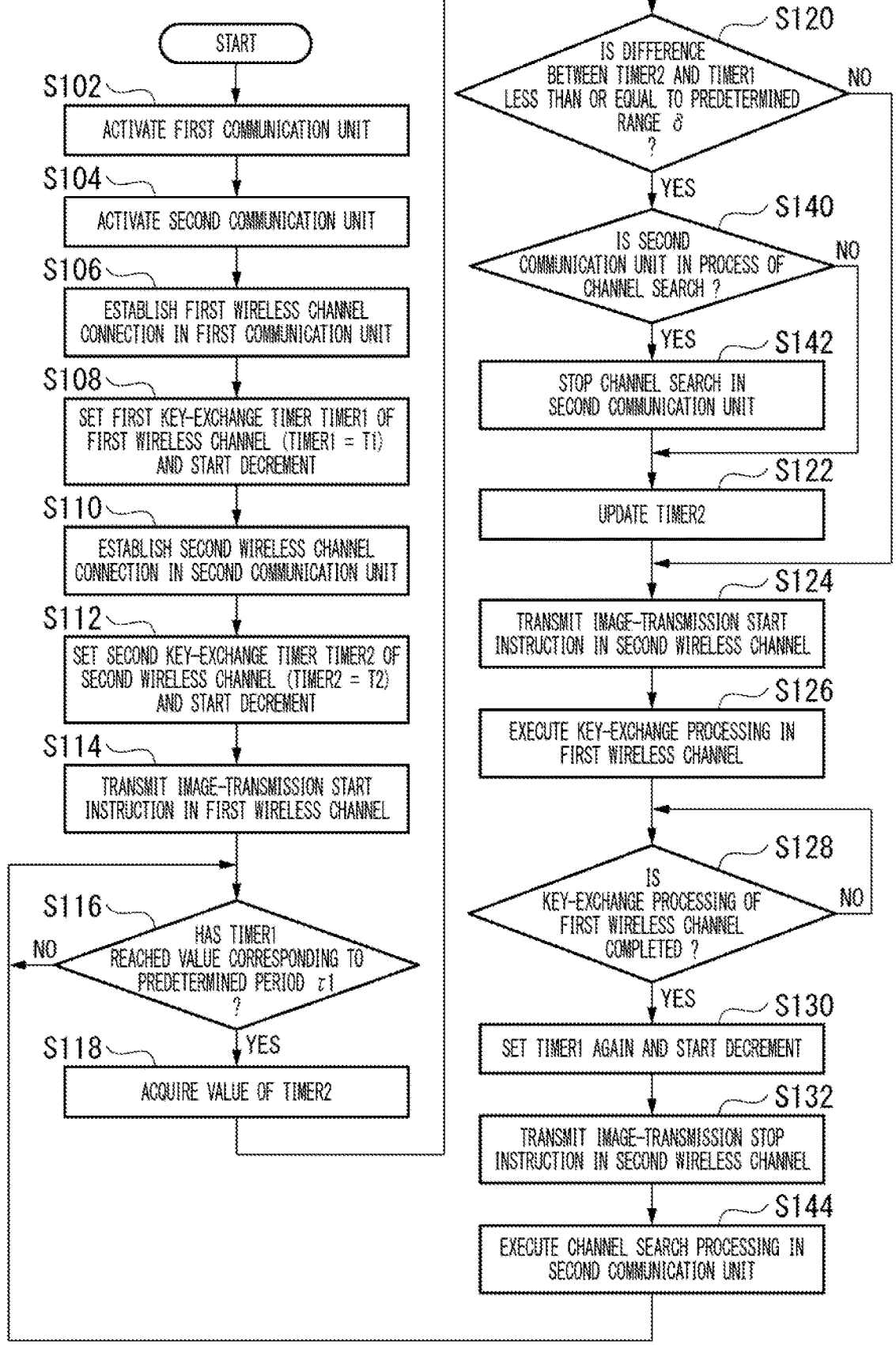
FIG. 7 is a flow chart showing a modified example of controlling timings of the key-exchange in the first communication device according to the embodiment of the present invention.

Next, an example of controlling timings of the key-exchange of an encryption key according to this modified example will be described. FIG. 7 is a flow chart showing an example of controlling timings of the key-exchange in the first communication device 10 according to this modified example. Common reference numerals are attached to rite processing and the configuration common to the example in FIG. 4 and the descriptions of the example will be cited.

The processing shown in FIG. 7 includes Steps S140 to S144 in addition to Steps S102 to S132.

In Step S120, when the difference (Timer2−Timer1) is less than or equal to the predetermined range δ (Step S120 YES), the processing of Step S140 is executed.

(Step S140) The wireless control unit 122 determines whether or not the second communication unit 16-2 is in the process of the channel search. The wireless control unit 122 can determine that the second communication unit 16-2 is in the process of the channel search by checking, for example, the flag indicating that the second communication unit 16-2 is in the process of the channel search on the basis of status information (not shown in the drawing) acquired from the second communication unit 16-2. When the wireless control unit 122 determines that the second communication unit 10-2 is in the process of the channel search (Step S140 YES), the processing of Step S142 is executed. When the wireless control unit 122 does not determine that the second communication unit 16-2 is in the process of the channel search (Step S140 NO), the processing of Step S122 is executed.

(Step S142) The wireless control unit 122 stops the channel search in the second communication unit 16-2. And the wireless control unit 122 sets parameters to the second communication unit 16-2 for transmitting the image data and enables the second communication unit 16-2 to transmit the image data in the second wireless channel that has been set in Step S110. Thereafter, the processing of Step S122 is executed.

In the processing shown in FIG. 7, the processing of Step S114 is executed after the processing of Step S132 is completed.

(Step S144) The wireless control unit 122 causes the second communication unit 16-2 to execute the channel search. After the channel search is executed, the processing of Step S116 is executed.

According to the above-described procedures, the key-exchange control unit 124 of the first communication device 10 can set the execution period of the key-exchange processing in the first communication unit 16-1 so that the execution period does not overlap the channel-search period of the second communication unit 16-2 as well as at least part of a period of the key-exchange processing in the second wireless channel.

The key-exchange control unit 124 can set the execution period of the key-exchange processing in the second communication unit 16-2 so that the execution period docs not overlap the channel-search period of the first communication unit 16-1 as well as a period of the key-exchange processing in the first wireless channel. In such a case, the second communication unit 16-2 is a communication unit of the control target instead of the first communication unit 16-1 in the processing of FIG. 6.

Next, a second modified example of the embodiment of the present invention will be described. In this modified example, the key-exchange control unit 124 of the first communication device 10 sets an execution period of the key-exchange processing in the first communication unit 16-1 so that part of the execution period of the key-exchange processing in the first communication unit 16-1 does not overlap at least part of a channel-switching period of the second communication unit 16-2 as well as at least part of a period of the key-exchange processing in the second wireless channel. The channel switching period is a period in which the second communication unit 16-2 executes channel switching. The channel switching is processing of switching the wireless channel used at the current time point to another wireless channel. The wireless channel used for switching may be a wireless channel searched for through the channel search or may be a predetermined wireless channel.

The second communication unit 16-2, for example, starts the channel switching in any one of the following cases.

(1) The case in which the intensity of the second wireless channel used at the current time point is less than a predetermined first threshold value and the intensity of the third wireless channel that is a wireless channel of a switching destination is greater than or equal to a predetermined second threshold value. Here, the second threshold value is greater than the first threshold value.

(2) The case in which the third wireless channel searched for through the channel search has greater intensity than the radio wave intensity of the second wireless channel that has been used until the current time point.

(3) The case in which the third wireless channel searched for through the channel search has a smaller number of detected beacons (number of detected access points) than the number in the second wireless channel.

Various other methods can be adopted as a method of the channel search.

Figure 8:
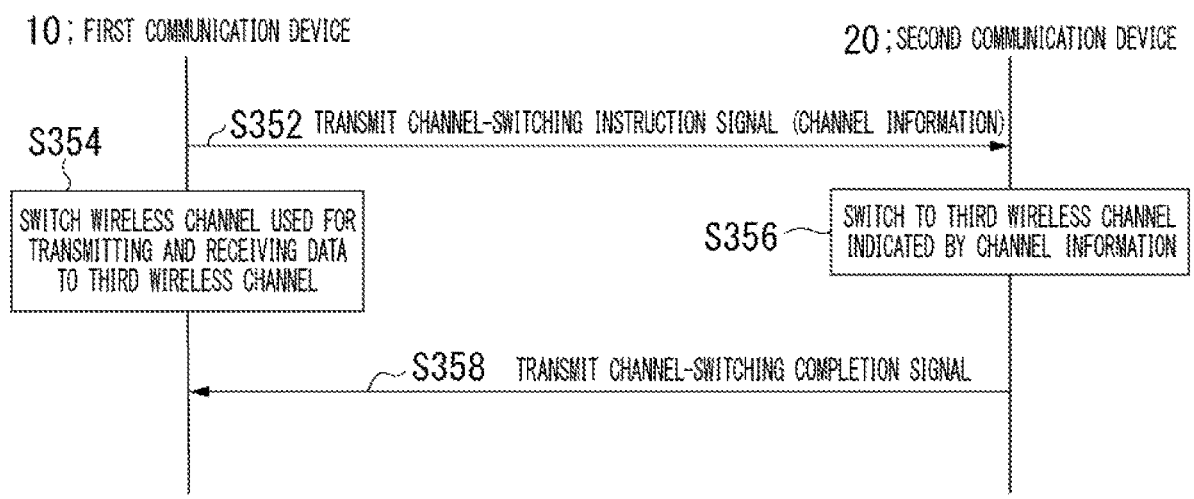
FIG. 8 is a flow chart showing an example of wireless channel-switching processing of the embodiment of the present invention.

The channel-switching processing shown in FIG. 8 includes the following processing steps.

(Step S352) When the channel switching is started, the second communication unit 16-2 of the first communication device 10 outputs a channel-switching start signal to the wireless control unit 122. The second communication unit 16-2 transmits a channel-switching instruction signal to the second communication unit 26-2 of the second communication device 20 by using the second wireless channel. The channel-switching instruction signal includes channel information indicating the third wireless channel and timing information indicating a timing of the channel switching. For example, the timing information indicates a timing after the beacon is detected N (N is one or more integers) tunes.

(Step S354) The second communication unit 16-2 of the first communication device 10 switches the wireless channel to the third wireless channel following a predetermined timing after the second communication unit 16-2 transmits the channel switching instruction signal to the second communication device 20.

(Step S356) When the second communication unit 26-2 of the second communication device 20 receives the channel-switching start signal front the second communication unit 16-2 of the first communication device 10, the second communication unit 26-2 extracts the channel information and the timing information from the received channel-switching start signal. The second communication unit 26-2 switches the wireless channel used for transmitting the image data to the third wireless channel indicated by the channel information extracted from the second wireless channel after the predetermined timing. This predetermined timing is specified by the timing information.

(Step S356) The second communication unit 26-2 transmits a channel switching completion signal, for example, a null packet or the like) indicating completion of the channel switching to the second communication unit 16-2 of the first communication device 10 by using the changed third wireless channel.

When the second communication unit 16-2 receives the channel switching completion signal by using the third wireless channel, the second communication unit 16-2 outputs the channel-switching completion signal to the wireless control unit 122.

Figure 9:
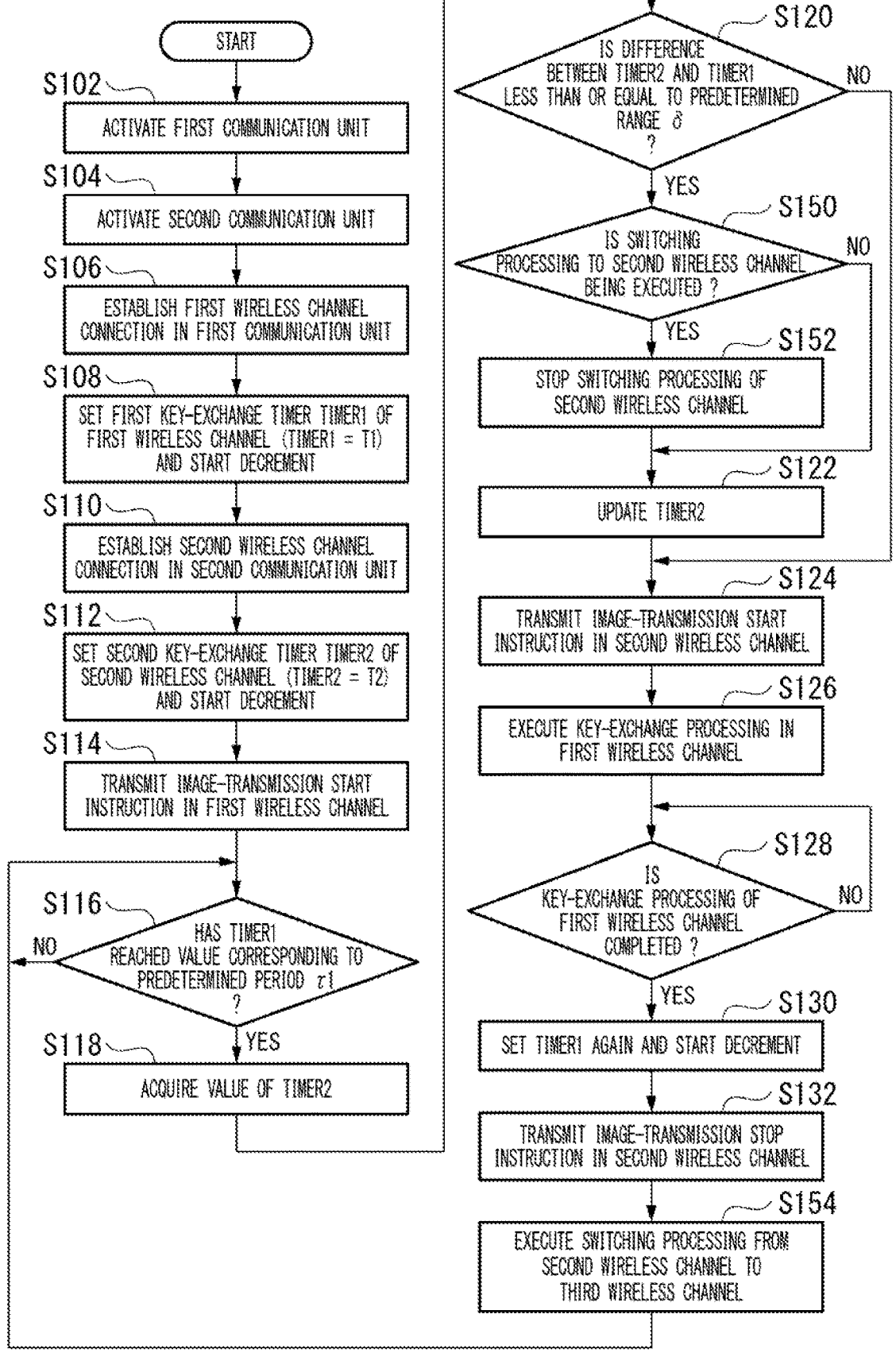
FIG. 9 is a flow chart showing another modified example of controlling timings of the key-exchange in the first communication device according to the embodiment of the present invention.

Next, an example of controlling timings of the key-exchange of an encryption key according to this modified example will be described. FIG. 9 is a flow chart showing an example of controlling timings of the key-exchange in the first communication device 10 according to this modified example. Common reference numerals are attached to the processing and the configuration common to the example in FIG. 4 and the descriptions of the example will be cited.

The processing shown in FIG. 9 includes Steps S150 to S134 in addition to Steps S102 to S122.

When the difference (Timer2−Timer1) is less than or equal to the predetermined range δ (Step S120 YES) the processing of Step S150 is executed.

(Step S150) The wireless control unit 122 determines whether or not the second communication unit 16-2 is in the process of the channel switching processing. The wireless control unit 122, for example, can determine that the second communication unit 16-2 is in the process of the channel-switching processing when the channel-switching completion signal has not been received from the second communication unit 16-2 after the channel-switching start signal indicating the start of the channel switching is received from the second communication unit 16-2. When the second communication unit 16-2 is in the process of the channel-switching processing (Step S150 YES), the processing of Step S152 is executed. When the second communication unit 16-2 is not in the process of the channel-switching processing (Step S150 NO), the processing of Step S122 is executed.

(Step S152) The wireless control unit 122 stops the channel switching processing in the second communication unit 16-2. The wireless control unit 122 sets parameters to the second communication unit 16-2 for transmitting the image data and enables the second communication unit 16-2 to transmit the image data in the second wireless channel that has been set in Step S110. Thereafter, the processing of Step S122 is executed.

In the processing shown in FIG. 9, the processing of Step S154 is executed after the processing of Step S132 is completed.

(Step S154) The wireless control unit 122 causes the second communication unit 16-2 to execute processing of switching to the third wireless channel. After switching to the third wireless channel is completed, the processing of Step S116 is executed.

FIG. 9 shows the example in which the channel switching is executed independently of the channel search, but the embodiment of the present invention is not limited to this. When the wireless control unit 122 does not determine that the second communication unit 16-2 is in the process of the channel search (Step S140 NO) in the processing of Step S140 (FIG. 7) and after the processing of Step S142 (FIG. 7) is executed, the processing of Step S154 (FIG. 9) may be executed.

In addition, after the processing of Step S144 is executed and when the start condition of the above-described channel-switching processing is met, the processing of Step S154 (FIG. 9) may be executed.

According to the above-described procedures, the key-exchange control unit 124 of the first communication device 10 can set the execution period of the key-exchange processing in the first communication unit 16-1 so that the execution period does nor overlap the channel switching period in the second communication unit 16-2 as well as a period of the key-exchange processing in the second wireless channel. In addition, it is possible to prevent the execution period of the key-exchange processing in the first communication unit 16-1 from overlapping the channel-search period in the second communication unit 16-2. Also, it is possible to prevent the channel-switching period in the second communication unit 16-2 from overlapping the key exchange processing in the second wireless channel.

The key-exchange control unit 124 can set the execution period of the key-exchange processing in the second communication unit 16-2 so that the execution period does not overlap at least part of the channel-switching period in the first communication unit 16-1 as well as at least part of the execution period of the key-exchange processing in the first wireless channel. In such a case, the second communication unit 16-2 is a communication unit of the control target instead of the first communication unit 16-1 in the processing of FIG. 7. Thus, it is possible to prevent the execution period of the key-exchange processing in the second communication unit 16-2 from overlapping the channel-search period in the first communication unit 16-1. Also, it is possible to prevent the channel-switching period in the first communication unit 16-1 from overlapping the key-exchange processing in the first wireless channel.

Next, the embodiment of the present invention will be summarized. The wireless communication system 1 includes the first communication device 10 and the second communication device 20. The first communication device 10 includes the first communication unit 16-1 that connects to the second communication device 20 by using the first wireless channel, the second communication unit 16-2 that connects to the second communication device 21) by using Lite second wireless channel, and the control unit 12. The control unit 12 causes the first communication unit 16-1 to execute, for a predetermined cycle, first key-exchange processing of updating a first encryption key used for encrypting data transmitted by using the first wireless channel. In addition, the control unit 12 causes the second communication unit 16-2 to execute, for a predetermined cycle, second key exchange processing of updating a second encryption key used for encrypting data transmitted by using the second wireless channel. The control unit 12 controls the period of one of the first key-exchange processing and the second key-exchange processing so that at least part of the first execution period of the first key exchange processing does not overlap the second execution period of the second key-exchange processing. When streaming data are transmitted by using one of the first wireless channel and the second wireless channel and before the key-exchange processing in the wireless channel used for transmitting the streaming data is started, the wireless channel used for transmitting the streaming data is changed to the other of the first wireless channel and the second wireless channel.

According to this configuration, it is possible to continue transmission of the streaming data without a stop by using one of the first wireless channel and the second wireless channel in which the key-exchange processing is not executed. Therefore, it is possible to ensure the security of the key-exchange and, at the same time, avoid reducing the degree of transmission quality due to the stoppage of the streaming data. In a case in which image data are used as the streaming data, the quality of the image in the transmission destination is secured.

In addition, when the key-exchange processing in one wireless channel is completed, the control unit 12 changes the wireless channel used for transmitting the streaming data to the one wireless channel.

According to this configuration, the one wireless channel is used for transmitting the streaming data as much as possible. Therefore, it is possible to secure the other wireless channel for transmitting and receiving other data.

In addition, the control unit 12 sets the execution period of the key exchange processing in one wireless channel without overlapping at feast part of the channel-search period of the other communication unit connecting to the second communication device 20 by using the other wireless channel.

According to this configuration, it is possible to continue transmission of the streaming data in the one wireless channel in the channel-search period of the other communication unit. Therefore, it is possible to avoid reducing the degree of transmission quality due to the stoppage of the streaming data.

In addition, the control unit 12 further sets the execution period of the key-exchange processing in one wireless channel without overlapping at least part of the channel-switching period in which the other wireless channel is switched to the third wireless channel.

According to this configuration, it is possible to continue transmission of the streaming data in the one wireless channel in the channel switching period of the other communication unit. Therefore, it is possible to avoid reducing the degree of transmission quality due to the stoppage of the streaming data.

In addition, the control unit 12 further sets the channel-switching period to a period that does not overlap at least part of the execution period of the key-exchange processing in the other wireless channel.

According to this configuration, it is possible to continue transmission of the streaming data in the one wireless channel and, at the same time, secure the communication quality and the security in the other communication unit, since the channel-switching processing in the other communication unit and the key-exchange processing in the other wireless channel are surely executed.

In the embodiment and the modified examples of the present invention described above, the case in which the streaming data are mainly image data indicating moving images is shown, but the embodiment of the present invention is not limited to this. The streaming data have only to be data that are temporally consistently acquired and transmitted. The streaming data may include audio data instead of image data or along with the image data.

In addition, in the embodiment and the modified examples of the present invention described above, the case in which the multicast key GTK is encrypted and decrypted and then the streaming data are transmitted is shown, but the embodiment of the present invention is not limited to this. When the streaming data are transmitted, the temporary key TK may be used for encryption and decryption.

Part of the first communication device 10 and the second communication device 20, for example, the control unit 12 and the control unit 22 may be realized by a computer. In such a case, the program for realizing this control function may be realized by recording the program on a computer-readable recording medium, reading the program recorded on the recording medium onto a computer system, and executing the program. Here, the "computer system" described above is configured to be a computer system built in the first communication device 10 and the second communication device 20 and include OS and hardware such as a peripheral device. In addition, the "computer-readable recording medium" means a portable medium such as a flexible disk, a magneto-optical disk, a ROM, and a CD- ROM and a storage device such as a hard disk built in the computer system. Moreover, the "computer-readable recording medium" may dynamically hold a program for a short period of time like a communication line or the like used in a case in which the program is transmitted by using a network such as the Internet and a communication circuit line such as a telephone circuit line or may hold the program for a certain period of time like a volatile memory inside the computer system Unit is a server or a client of the case. In addition, the above described program may be configured to realize some of the functions described above and may be configured to realize the functions described above in combination with a program that has already been recorded in the computer system.

In addition, all or part of the first communication device 10 and the second communication device 20 in the embodiment of the present invention described above may be realized as an integration circuit such as the large-scale integration (LSI) or the like. Each of the functional blocks of the first communication device 10 and the second communication device 20 may be separately configured as a processor or all or some of the functional blocks may be integrated to configure a processor. In addition, the technique of integrating circuits is not limited to the LSI and may be realized by a dedicated circuit or a general-purpose processor. Moreover, in a case in which a technique of integrating circuits that replaces the LSI emerges according to the advancement of the semiconductor technology, an integration circuit realized by the technique may be used.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication system, comprising:
   a first communication device; and
   a second communication device,
   wherein the first communication device includes:
      a first communicator configured to connect to the second communication device by using a first wireless channel and, at a timing at which a first key-exchange timer expires, update a first encryption key used for encrypting data transmitted by using the first wireless channel,
         wherein a first value that is a value of the first key-exchange timer is decremented in accordance with passage of time;
      a second communicator configured to connect to the second communication device by using a second wireless channel and, at a timing at which a second key-exchange timer expires, update a second encryption key used for encrypting data transmitted by using the second wireless channel,
         wherein a second value that is a value of the second key-exchange timer is decremented in accordance with passage of time; and
      a control circuit, and
   when streaming data are transmitted by using one wireless channel of the first wireless channel and the second wireless channel and a difference between the first value and the second value is greater than a predetermined range, the control circuit is configured to change a wireless channel used for transmitting the streaming data to the other wireless channel of the first wireless channel and the second wireless channel before key exchange processing in the one wireless channel is started,
   wherein the predetermined range is greater than a period of first key-exchange processing for updating the first encryption key and a period of second key-exchange processing for updating the second encryption key.

2. The wireless communication system according to claim 1,
   wherein, when the key-exchange processing in the one wireless channel is completed, the control circuit is configured to change the wireless channel used for transmitting the streaming data to the one wireless channel.

3. The wireless communication system according to claim 1,
   wherein the control circuit is configured to set a period of the key-exchange processing in the one wireless channel to a period not overlapping a channel-search period in the first communicator or the second communicator that connects to the second communication device by using the other wireless channel.

4. The wireless communication system according to claim 1,
   wherein the control circuit is configured to set a period of the key-exchange processing in the one wireless channel to a period not overlapping a channel-switching period in which the other wireless channel is switched to a third wireless channel.

5. The wireless communication system according to claim 4,
   wherein the control circuit is configured to set the channel-switching period to a period not overlapping a period of key-exchange processing in the other wireless channel.

6. A wireless communication device, comprising:
   a first communicator configured to connect to an external communication device by using a first wireless channel and, at a timing at which a first key-exchange timer expires, update a first encryption key used for encrypting data transmitted by using the first wireless channel,
      wherein a first value that is a value of the first key-exchange timer is decremented in accordance with passage of time;
   a second communicator configured to connect to the external communication device by using a second wireless channel and, at a timing at which a second key-exchange timer expires, update a second encryption key used for encrypting data transmitted by using the second wireless channel,
      wherein a second value that is a value of the second key-exchange timer is decremented in accordance with passage of time; and
   a control circuit,
   wherein, when streaming data are transmitted by using one wireless channel of the first wireless channel and the second wireless channel and a difference between the first value and the second value is greater than a predetermined range, the control circuit is configured to change a wireless channel used for transmitting the streaming data to the other wireless channel of the first wireless channel and the second wireless channel before key exchange processing in the one wireless channel is started, wherein the predetermined range is greater than a period of first key-exchange processing for updating the first encryption key and a period of second key-exchange processing for updating the second encryption key.

7. A wireless communication method in a wireless communication system including a first communication device anti a second communication device, the wireless communication method comprising a step, wherein the first communication device includes:
- a first communicator configured to connect to the second communication device by using a first wireless channel and, at a timing at which a first key-exchange timer expires, update a first encryption key used for encrypting data transmitted by using the first wireless channel,
  wherein a first value that is a value of the first key-exchange timer is decremented in accordance with passage of time; and
- a second communicator configured to connect to the second communication device by using a second wireless channel and, at a timing at which a second key-exchange timer expires, update a second encryption key used for encrypting data transmitted by using the second wireless channel,
  wherein a second value that is a value of the second key-exchange timer is decremented in accordance with passage of time, when streaming data are transmitted by using one wireless channel of the first wireless channel and the second wireless channel and a difference between the first value and the second value is greater than a predetermined range, a wireless channel used for transmitting the streaming data is changed to the other wireless channel of the first wireless channel and the second wireless channel in the step before key exchange processing in tire one wireless channel is started, wherein the predetermined range is greater than a period of first key-exchange processing for updating the first encryption key and a period of second key-exchange processing for updating the second encryption key.

8. A non-transitory computer-readable recording medium saving a program for causing a computer of a communication device to execute a process, wherein the communication device includes:
- a first communicator configured to connect to an external communication device by using a first wireless channel and, at a timing at which a first key-exchange timer expires, update a first encryption key used for encrypting data transmitted by using the first wireless channel,
  wherein a first value that is a value of the first key-exchange timer is decremented in accordance with passage of time; and
- a second communicator configured to connect to the external communication device by using a second wireless channel and at a timing at which a second key-exchange timer expires, update a second encryption key used for encrypting data transmitted by using the second wireless channel,
  wherein a second value that is a value of the second key-exchange timer is decremented in accordance with passage of time, when streaming data are transmitted by using one wireless channel of the first wireless channel and the second wireless channel and a difference between the first value and the second value is greater than a predetermined range, the computer changes, in the process, a wireless channel used for transmitting the streaming data to the other wireless channel of the first wireless channel and the second wireless channel before key-exchange processing in the one wireless channel is started, wherein the predetermined range is greater than a period of first key-exchange processing for updating the first encryption key and a period of second key-exchange processing for updating the second encryption key.

9. The wireless communication system according to claim 1, wherein, when the difference is less than the predetermined range, the control circuit is configured to update any one of the first value and the second value so that the difference becomes greater than the predetermined range.

* * * * *